United States Patent Office 3,455,943

Patented July 15, 1969

3,455,943
CERTAIN 5,8-DIHYDRO-β-CARBOLINES

William Alan Remers, Suffern, N.Y., and Martin Joseph Weiss, Oradell, N.J., assignors to American Cyanamid Company, Stamford, Conn., a corporation of Maine No Drawing. Filed Oct. 21, 1966, Ser. No. 588,317
Int. Cl. C07d 57/06
U.S. Cl. 260—296 4 Claims

ABSTRACT OF THE DISCLOSURE

The preparation of substituted 5,8-dihydro-β-carbolines, is described. These compounds are prepared by reacting the corresponding substituted β-carboline with an alkali metal or alkaline earth metal in liquid ammonia in the presence of an alkanol. The compounds of the invention are useful for their anti-depressant activity.

This invention relates to new organic compounds. More particularly, the invention is concerned with novel substituted 5,8-dihydro-β-carbolines as represented by the following general formula:

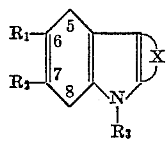

wherein $R_1$ is a member of the group consisting of hydrogen and lower alkoxy; $R_2$ is a member of the group consisting of hydrogen and lower alkoxy; $R_3$ is a member of the group consisting of hydrogen and lower alkyl; and X is a divalent radical selected from the group consisting of

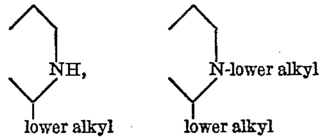

and

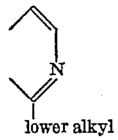

and the non-toxic acid addition salts thereof.

The compounds of this invention are in general, white crystalline compounds, insoluble in water and soluble in the more common organic solvents, as for example, alcohol and acetone. The acid addition salts of the compounds are soluble in water.

The novel compounds of this invention may be prepared by the reduction of the corresponding β-carbolines of the formula:

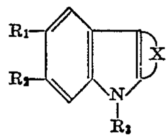

wherein $R_1$, $R_2$, $R_3$, and X are as defined above, with an alkali metal such as lithium and an alcohol such as methanol in liquid ammonia. The following equation is illustrative of the process when specifically applied to 7-methoxy-1-methyl-β-carboline, known also as harmine, to produce 5,8-dihydro-7-methoxy-1-methyl-β- carboline.

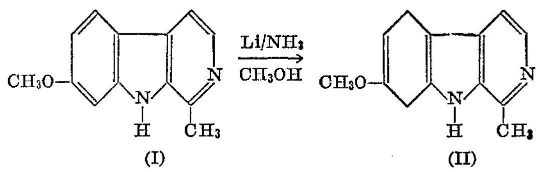

Treatment of the 5,8-dihydro-β-carbolines thus prepared with an acid such as hydrochloric acid gives the corresponding ketotetrahydro-β-carbolines, and such ketotetrahydro-β-carbolines are also a part of this invention. This preparation may be illustrated by the following equation.

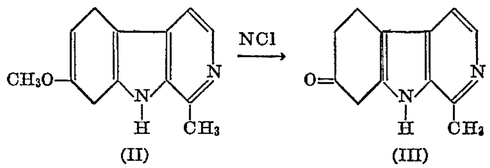

The preparation of methoxy-5,8-dihydro-β-carbolines by metal-in-ammonia reduction of the corresponding methoxy-β-carbolines represents a novel and unexpected application of this method. In general, the pyridine ring is more readily reduced than is the benzene ring. This relation holds true in the β-carbolines wherein reduction under a variety of conditions affords the 1,2,3,4-tetrahydro derivatives [Advances in Heterocyclic Chemistry, vol. 3, ed. by A. R. Katritzky, Academic Press, New York, 1964, p. 100–103]. Catalytic reduction in acetic acid of β-carbolines gives reduction in the benzene ring, but only the 5,6,7,8-tetrahydro derivative is formed [ibid. p. 103]. Furthermore, previous investigations revealed that metal-in-ammonia reductions of heterocycles containing both benzene and pyridine rings, such as quinoline [J. Am. Chem. Soc., 65, 410 (1943)] and isoquinoline [Tetrahedron, 6, 148 (1959)], 6 148 (1959)] afforded derivatives which are dihydrogenated in the pyridine ring. The results described in the present invention are in contradiction to the predictions which would follow from this prior art. There has been no previous report of the preparation of 5,8-dihydrogenated derivatives of 1,2,3,4-tetrahydro-β-carbolines, although simple indoles have been reduced to 4,7-dihydro derivatives with metal-in-ammonia systems [J. Chem. Soc., 1960, 4609]. The simple indoles gave mixtures of products, whereas in the present invention reduction of 1,2,3,4-tetrahydro-β-carbolines gives good yields of the 5,8-dihydro derivative as the sole isolable product.

The novel methoxy 5,8-dihydro-β-carbolines of the present invention possess useful anti-depressant activity. For example, 5,8-dihydro-7-methoxy-1-methyl-β-carboline (II) is active at a dose of 6.25 mg./kg. in experimental mice. They are also exceedingly active as inhibitors of monoamine oxidase. In addition, these compounds are useful intermediates in the preparation of the corresponding ketotetrahydro-β-carbolines such as (III), which are also active anti-depressant agents.

The following examples illustrate the preparation of specific β-carbolines of the present invention.

EXAMPLE 1

Preparation of 5,8-dihydro-7-methoxy-1-methyl-β-carboline (II)

A suspension of 3.49 g. of harmine (7-methoxy-1-methyl-β-carboline) in 700 ml. of liquid ammonia and 70 ml. of ether is treated with 2.0 g. of lithium. The resulting blue mixture is stirred for 1 hour and then treated dropwise with methanol until the color is discharged. After evaporation of the ammonia, the residue is treated with water and methylene chloride. The organic layer is dried and concentrated and the residual solid is purified by partition chromatography on diatomaceous earth with a methanol-heptane system. This procedure gives the desired product as white solid, melting point 218–219.5° C. This product forms with acetic acid in ether an acetate salt, melting point 175–177° C., which is an active antidepressant at a dose of 6.25 mg./kg. in experimental mice. Substitution of calcium or barium metal for lithium in the process of this example is also productive of 5,8-dihydro-7-methoxy-1-methyl-β-carboline.

EXAMPLE 2

Preparation of 5,8-dihydro-6-methoxy-1-methyl-β-carboline

Treatment of 6-methoxyharman by the procedure described in Example 1, gives the above product as white solid, melting point 205–208° C. This product forms an acetate salt, melting point 195–200° C., which is an active antidepressant at a dose of 5.0 mg./kg. in experimental mice.

EXAMPLE 3

Preparation of 1,2,3,4,5,8-hexahydro-6-methoxy-1-methyl-β-carboline

Treatment of 6-methoxy-1,2,3,4-tetrahydroharman by the procedure described in Example 1 gives without purification by partition chromatography the above product as white solid, melting point 168–172° C. This product forms an acetate salt, melting point 190° C.

EXAMPLE 4

Preparation of 1,2,3,4,5,8-hexahydro-7-methoxy-1-methyl-2-propyl-β-carboline

Treatment of N-(PY)-propyltetrahydroharman by the procedure described in Example 1 gives the desired product as an oil, λ max. 6.0 μ. This product forms an acetate salt, melting point 111.5–114° C.

EXAMPLE 5

Preparation of 5,8-dihydro-1,9-dimethyl-7-methoxy-β-carboline and 1,9-dimethyl-7-methoxy-5,8,5a,8a-tetrahydro-β-carboline Treatment of N-(ind)-methylharmine (J. Chem. Soc., 1954, 1242) by the procedure described in Example 1 gives 5,8-dihydro-1-9-dimethyl-7-methoxy-β-carboline as an off white solid, melting point 80–87° C., acetate salt 100–103° C. Also formed is 1,9-dimethyl-7-methoxy-5,8,5a,8a-tetrahydro-β-carboline as a colorless oil. The latter product gives a hydrochloride salt, melting point 208–209.5° C.

EXAMPLE 6

Preparation of 7-keto-1-methyl-5,6,7,8-tetrahydro-β-carboline (III)

A mixture of 100 mg. of 5,8-dihydro-7-methoxy-1-methyl-β-carboline (Example 1) and 10 ml. of 1% hydrochloric acid is stirred until a clear solution results. It is then made alkaline and extracted with methylene chloride. This extract is washed with water, dried, and concentrated, and the residue is crystallized two times from methylene chloride-hexane. This procedure gives the above product as white needles, melting point 215–218° C. It is an active antidepressant at a dose of 12:5 mg./kg. in experimental mice.

We claim:

1. A β-carboline selected from the group consisting of those of the formula:

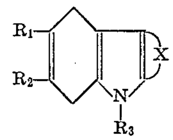

wherein $R_1$ is a member of the group consisting of hydrogen and lower alkoxy; $R_2$ is a member of the group consisting of hydrogen and lower alkoxy; $R_3$ is a member of the group consisting of hydrogen and lower alkyl; and X is the divalent radical

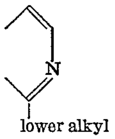

and the non-toxic acid addition salts thereof.

2. The β-carboline in accordance with claim 1; 5,8-dihydro-7-methoxy-1-methyl-β-carboline.

3. The β-carboline in accordance with claim 1; 5,8-dihydro-6-methoxy-1-methyl-β-carboline.

4. The β-carboline in accordance with claim 1; 5,8-dihydro-1,9-dimethyl-7-methoxy-β-carboline.

References Cited

O'Brien et al.: J. Chem. Soc., London, 1960, pp. 4609–12.

HENRY R. JILES, Primary Examiner

A. L. ROTMAN, Assistant Examiner

U.S. Cl. X.R.

260—999